United States Patent [19]
Leistner et al.

[11] 3,724,936
[45] Apr. 3, 1973

[54] MOTION PICTURE CAMERA

[75] Inventors: Rudolf Leistner, Munich; Johann Roth, Schwabhausen; Alfred Renndorfer, Munich, all of Germany

[73] Assignee: Niezoldi & Kramer GmbH, Munchen-Allach, Germany

[22] Filed: Nov. 12, 1970

[21] Appl. No.: 88,631

[30] Foreign Application Priority Data

Nov. 22, 1969 Germany..................P 19 58 682.4

[52] U.S. Cl..................................................352/91
[51] Int. Cl..............................................G03b 21/36
[58] Field of Search..............................392/91, 217

[56] References Cited

UNITED STATES PATENTS

| | | | |
|---|---|---|---|
| 1,597,229 | 8/1926 | Ball | 352/91 X |
| 3,582,198 | 6/1971 | Reinsch | 352/91 |
| 2,117,694 | 5/1938 | Becker | 352/217 |
| 3,246,944 | 4/1966 | Winkler | 352/91 |
| 3,545,852 | 12/1970 | Winkler | 352/91 |
| 3,567,316 | 3/1971 | Wilharm | 352/91 |
| 3,549,249 | 12/1970 | Katsuyama | 352/91 |

*Primary Examiner*—Samuel S. Matthews
*Assistant Examiner*—Monroe H. Hayes
*Attorney*—Ernest F. Marmorek

[57] ABSTRACT

A motion picture camera having a diaphragm, a winding spool, a fade-over device for fading-over two film scenes including a device for measuring off the same length of film for fading-out a film section and for subsequently fading-over the same film section, and a reversible electric motor for driving the camera, comprising a a control device drivingly connected to the electric motor such that the control device rotates always in the same direction and that it carries out during one single complete revolution the following fade-over phases necessary for a complete fade-over of the film scene: a first phase coupling exposing first the film section with the diaphragm closing in a continuous manner, a second phase coupling rewinding the film section with the diaphragm closed, and stopping the electric motor, and a third phase coupling re-exposing the film section with the diaphragm opening in a continuous manner.

19 Claims, 2 Drawing Figures

PATENTED APR 3 1973 3,724,936.

INVENTORS:
Rudolf Leistner,
Johann Roth and
Alfred Reindorfer,
BY
*[signature]*
Their Attorney

MOTION PICTURE CAMERA

BACKGROUND OF THE INVENTION

The present invention relates to a motion picture camera with a device for automatically fading-over two film scenes, which also measures-off the film section for the fading-out and the subsequent fading-over of a film scene to the proper, same length, said camera also having an electro-motor camera drive and preferably a winding spool locked against reverse rotation.

A motion picture camera with a spring-operated mechanism as a drive motor is already known, which camera is also equipped with a fading-over device driven by the spring mechanism. This fading-over device brings about the automatic sequence of all fading-over phases necessary for the complete fading-over of two film scenes, upon coupling of the fading-over device with the driving spring mechanism of the camera. These necessary fading-over phases comprise: the first forward transport or movement of the film section intended for the fading-over phase with a continuously closing diaphragm, the subsequent return transport of this same film section with the diaphragm closed, and the second forward transport of this film section with a continuously opening diaphragm.

One of the disadvantages of this prior art camera consists in that during the fading-over process the user of the camera is not being notified of the completion of the first of the two film scenes to be faded-over, so that he is not in a position to turn off the camera drive in a timely manner.

It is the purpose of fading over two film scenes to characterize the spacing of two subsequent film scenes as to space or time. The second of the two film scenes to be faded-over is, therefore, in general shot at a place and a time which does not coincide with the time and place of the preceding film scene. If the spacing as to time is great, the user of the camera may easily have forgotten that the preceding film scene was finished by a fade-out scene. Also of this fact the user of the heretofore known camera is not being notified so that during the shooting he is uncertain of whether this scene is being filmed with a continuously opening diaphragm or with a diaphragm opening properly adjusted as to the exposure value.

Furthermore, with this known motion picture camera it is neither possible to provide a smooth or flowing transition of a film scene of random length which was exposed at the proper value into the fading-out phase, nor the smooth or flowing transition of a film scene begun with the fading-in phase into a properly exposed phase of random length.

It is, therefore, an object of the present invention to provide a motion picture camera of the general type referred to above, in which each started film scene independently of its length can be completed by fading-out, and in which the following film scene is definitely being begun with a fading-in scene, and after this fading-in continued without interruption with an exposure value which corresponds to the actual lighting conditions.

BRIEF SUMMARY OF THE INVENTION

The above-mentioned problem has been solved in accordance with the present invention by a motion picture camera equipped with a control member which carries out one single revolution during the entire fading-over process. This control member is always driven in the same direction by the electro-motor camera drive although the latter change from one direction of rotation to the other. Furthermore, the control member is operable to effect during its single revolution the functionally proper course of all fade-over phases necessary for a complete fading-over of a film scene, namely the first exposure of the film section provided for the fading-over with a continuously closing diaphragm, the subsequent return transport of this same film section with closed diaphragm and the second exposure of this film section with a continuously opening diaphragm. Finally, the control member stops the camera drive after the return transport of the film section first exposed.

With the control member carrying out during the entire fading-over process one single revolution, in combination with the electromotor drive of the camera, separate, non-repetitive control instructions can be given which are optimally adapted to each fading-over phase, possibly including: properly stopping of the camera drive after the return transport of the film section exposed with the fading-out film scene.

The reversal of the direction of transportation of the film section provided for the fading-over process, is effected in a very simple manner by reversal of the direction of rotation of the electromotor of the camera which drives the film transporting means as well as the fading-over device. In order to guarantee that the direction of rotation of the control member of the fading-over device is always maintained, a reversing gear is provided between the camera drive and the rotating control member, said reversing gear operating in a manner dependent on the direction of rotation and reacting upon a change in the direction of rotation of the drive motor of the camera in the sense of maintaining the direction of rotation of the control member.

In order to assure a structure of the fading-over device which is as simple and clear as possible, the reversing gear simultaneously forms the coupling between the camera drive and the control member. Said coupling being held in idling position by an arresting means that is effective when the fading-over device is not being used.

BRIEF DESCRIPTION OF DRAWING

The invention is illustrated by way of example in the attached drawings, in which.

DETAILED DESCRIPTION OF A PREFERRED EMBODIMENT

Figure 1:
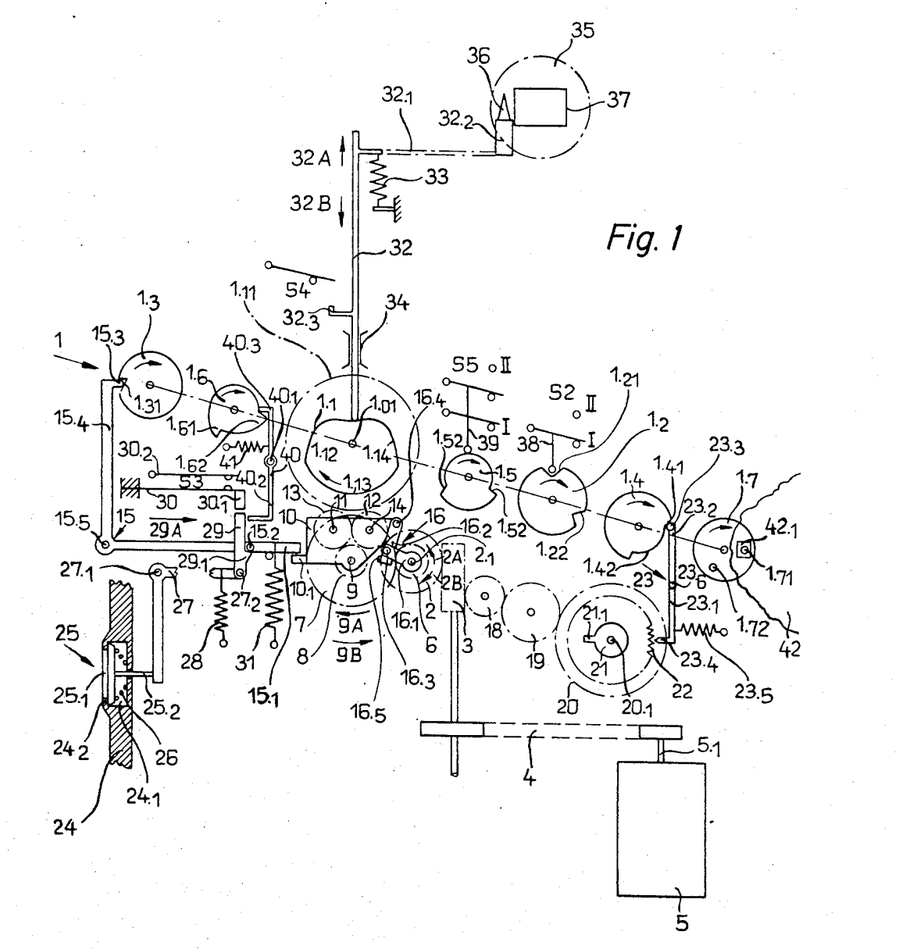
FIG. 1 diagrammatically illustrates the structure of the fade-over device of the motion picture camera according to the invention.

Referring to the drawing in detail and FIG. 1 in particular, the arrangement shown therein comprises a fade-over device with a control member 1 which carries out one complete revolution during the entire fade-over process, and comprises a series of switching and control curves 1.1 to 1.6 by means of which all necessary functions for a complete fade-over are initiated in the proper sequence, carried out and completed.

The drive for the fade-over device is effected by means of a gear 2 which is journalled on a fixed shaft 2.1, gear 2 being driven by a worm 3 and a reduction gear indicated with the reference numeral 4, by an electric motor 5 which can be driven in both directions. Gear 2 has fixedly connected thereto a gear 6 which is likewise journalled on shaft 2.1 and meshes with a gear 7 which is fixedly connected with a coaxial gear 8. The pair of gears 7,8 is journalled on a fixed shaft 9. Shaft 9 has mounted thereon a plate 10 which has connected thereto bearing shafts 11 and 12 for coupling gears 13 and 14. Plate 10 with coupling gears 13 and 14 forms a reversing gear which is interposed between the reduction gear formed by the gear pairs 2,6 and 7,8 and the control member 1 of the fade-over device, and which serves for maintaining the direction of rotation of the control member 1. Gear 8 rotating about the shaft 9 of plate 10 continuously meshes with gears 13 and 14 of the reversing gear. In FIG. 1, the reversing gear 10 occupies its idle position in which neither its coupling gear 13 nor its coupling gear 14 is in meshing engagement with a coupling gear 1.11 associated with the control member 1. This coupling gear 1.11 is mounted together with the remaining curve disks 1.2 to 1.6 of the control member 1 on a fixed shaft 1.01, coupling gear 1.11 being fixedly connected with a curve disk 1.1 which effects the control of the disphragm of the camera. All six curves 1.1 to 1.6 of the control member may be arranged in close contact with each other and combined into a packet. In FIG. 1 they have been shown as being further apart for reasons of clarity of illustration, the shaft 1.01 forming their common axis having been indicated by a dot-dash line.

The reversing gear 10,13 and 14 is held in its idle position by an arresting lever 15 the nose portion 15.1 of which rests against an abutment 10.1 of plate 10 to thereby prevent the same from rotating in clockwise direction. Similarly, the reversing gear is prevented from rotating in counter-clockwise direction by a knee-lever linkage 16 between the plate 10 and the shaft 2.1 of the drive gear 2 of the fade-over device.

The driving lever 16.1 of the knee-lever linkage 16 is frictionally held on the shaft 2.1 of gear 2. Consequently, it tends to tilt in counter-clockwise direction as indicated by the arrow 2A, during forward movement of the camera drive. Due to this movement, the driven lever 16.2 is pulled down by shaft 16.3 and the plate 10, physically mounted thereon by means of shaft 16.4, is tilted about the shaft 9 in clockwise direction as indicated by arrow 9A. This movement continues until the abutment 10.1 rests against the arresting nose portion 15.1. The reversing gear 10,13,14 is, therefore, during the normal film making process held in an idle position as long as the fade-over device is not in operation.

For purposes of fading-over two film scenes first the release of the camera is actuated whereby the electromotor 5 of the camera is driven in forward direction. According to FIG. 2, the current flows from the plus pole of the current source 17, via a switch S2 in switch position I, a closed switch S4, the closed release switch S1, the contact S5.1 of the pole reversing switch S5 in positionI, the winding of drive motor 5 and the contact S5.2 of the pole reversing switch S5 in position I, to the minus pole of current source 7.

The drive motor 5 starts running and drives, via the reduction gear 4 following the shaft 5.1, the drive worm 3 which, by means of a reduction gear 18,19 arranged in series therewith, on one hand drives a gripper feed mechanism and rotary shutter of the camera (not shown) and on the other hand is in driving connection with a gear 20 which, through the intervention of a friction means (not shown) drives a follower 21 which can be coupled to a hub of a film winding spool (not shown).

It is assumed that the film winding spool, as part of a film cassette, is journalled within the later and locked against reverse movement. This requires for winding of the film section provided for the fade-over process an arresting of the follower 21 during this fade-over process. For this purpose, between the follower 21 and the above-mentioned friction means preceeding the same, an arresting wheel 22 is provided which is fixedly connected with the follower 21 and cooperates with a spring-loaded arresting arm 23.1 during the fade-out phase and also during the re-winding phase. The arresting arm 23.1 is part of a double arm lever 23 which is rotatable about a fixed shaft 23.6, the arm 23.2 of the lever 23 resting by means of a feeler head 23.3 against the periphery of a radially effective control curve 1.4 of the control member 1, and the arm 23.1 of which is adapted to engage the tooth of the arresting gear 22 by means of an arresting tooth 23.4.

As long as the release S1 is depressed, the film is transported for instance with a frequency of 18 pictures per second while it is being wound upon the winding spool of the film cassette placed in the camera by the follower 21.

At the beginning of the fade-over phase also a fade-over key 25 is depressed which is axially movable in a cylindrical recess 24.1 of the camera housing 24, for actuating the release. This key 25 is stepped on the actuating side. It is, within the range of the step 25.1, overlapped by a collar 24.2 formed from the housing while key 25 rests with its step 25.1 against the collar under the influence of a compression spring 26 which on one hand rests against the backside of key 25 and on the other hand rests against the backside of the recess 24.2. A pin 25.2 is provided at the key 25, which pin abuts against a two-arm angle lever 27 journalled at 27.1. Lever 27 is under the influence of a tension spring 28 which tends to rotate the lever in clockwise direction so that the lever continuously rests against the pin 25.1 of the fade-over key 25.

If with running camera drive the fade-over key 25 is being depressed, the angle lever 27 rotates in counter-clockwise direction. During this movement, it lifts an arresting latch 29 which is pivoted at 27.2, against the pressure of a leaf spring 30 which comprises an abutment 30.1 designed as a bolt and against the end face of which arresting latch 29 comes to rest. It simultaneously forms the resilient contact of a switch S3 in the drive circuit of the camera and, in the lifted position of the angle lever 27 and thereby the arresting latch 29 comes into contact with the counter-contact 30.2 of the switch, so that S3 is closed.

The arresting latch 29 grips below a pin 15.2 of the arresting lever 15 with its arresting nose portion 29.1 and rotates the same against the tension of a spring 31 acting upon it in the release position so that the nose portion 15.1 releases the plate 10 of the reversing gear. Plate 10, in view of the momentum acting thereupon in coupling direction, from the proceeding transmission 2,6,7,8, rotates about the shaft 9 in clockwise direction while the gear 13 of the reversing gear comes in meshing engagement with the gear 1.11 of the control member 1. The depth of these two gears is limited by an abutment (not shown). The engagement of the two gears 13 and 1.11 is maintained in view of the momentum acting in coupling direction of the plate 10. The reversing gear consequently has coupled the camera drive with the fade-over device.

In view of this coupling, control member 1 and thereby also its diaphragm control curve 1.1 starts rotating in clockwise direction. The curve 1.1 comprises three curve areas which respectively extend over an arc of 120°. The curved area 1.12 closes the diaphragm in a continuous manner, the curved area 1.13 keeps the diaphragm in closed condition during the reverse transport of film section predetermined for the fade-over phase, and the curved area 1.14 takes care of the continuous opening of the diaphragm.

The adjustment of the diaphragm which exposes the film section provided for the fade-over phase first with a continuously faded-out film scene and upon rewinding of the film with a continuously faded-in film scene, is effected by means of an adjustment slide 32. Slide 32 is pressed against the periphery of a diaphragm control curve 1.1 by means of a tension spring 33 which is guided in the housing at 34. The diaphragm control slide 32 actuates, through the intervention of transmission members (not shown), the adjusting member of an adjustable rotatable shutter, of a wiper diaphragm, or of a variable resistance in the exposure circuit of the camera, in the sense of a continuous fading-out of the bundle of rays during displacement of the slide in the direction of arrow 32A and in the sense of a continuous fading-in of the bundle of rays during displacement of the slide 32 in the direction of the arrow 32B.

The adjusting slide 32 has connected to its associated extension 32.1 a colored covering flag 32.2 which is visible in the view finder field of vision 35 and preferably translucent. The flag is visible adjacent the view finder image field 37 by means of a conical mark 36 which tapers in upward direction and which is transparent or translucent. When lifting the slides in the direction of arrow 32A, the transparent cone 36 is continuously decreased in size in view of the covering flag 32.2 moving in the same direction, until it is completely covered.

The user of the camera can, when taking pictures, read in the viewer field of vision 35 when looking at the mark 36 cooperating with the flag 32.2, whether the diaphragm actuated by the slide 32 is just closing or opening, i.e. whether or not the diaphragm is in closed or in opened position.

A control finger 32.3 at slide 32 serves for opening switch S4 which is located in the drive circuit of the camera and in closed rest position, as soon as the slide 32 reaches its end position in which it closes the diaphragm.

Immediately upon the control member 1 starting to move, the change-over switch S2 is placed into its control position II by means of the control curve 1.2 rotating in clockwise direction and by means of the control push rod 38 being lifted thereby out of its control notch 1.21. In this way, the release key S1 is being bridged. Thus, the drive motor is also closed upon freeing of the release key of the camera to thereby prevent an electric interruption of the first two fade-over phases by the user of the camera, namely the phase "fading-out" and the phase "return movement of the film section provided for the fading-over".

Moreover, immediately upon the start of the movement of control member 1 the arresting lever 15 is prevented from rotating back into its arresting position by means of the control curve 1.3 rotating in the same direction. This is effected by the circumference of the control curve 1.3 against which rests a feeler head 15.3 at the arm 15.4 of the arresting lever 15 rotating about a fixed shaft 15.5, during the entire fading-over phase. This feeler head 15.3 has been tilted out of the notch 1.31 of the control curve 1.3 which determines the starting position of the lever 15 by depressing key 25. In this way, the functionally correct course of the first two fading-over phases "fading-out" and "film return transport" is assured, even with premature release of the fading-over key 25.

At least during the course of first fading-over phase, namely during the forward transport of the film section to be faded-over it is necessary, when using a film cassette with a winding spool locked against a reverse movement, to stop the spool hub so that the forwardly transported film section can be pushed back after the fading-out of the first film scene onto the supply spool of the film cassette. The stopping of the winding spool is effected by arresting the follower 21 which can be coupled to the hub of the winding spool. For this purpose, the control curve 1.4 of the control member 1 is provided. The control curve 1.4 is rotatable in clockwise direction with the control member 1, and immediately upon start rotates the arresting lever 23 in clockwise direction by means of its rising control surface 1.41, the arresting tooth 23.4 of the arresting lever 23 engaging the teeth of the arresting gear 22 so that the follower 21 driving the film winding spool of the cassette is prevented from rotating inspite of the running camera drive. The momentum of the gear 20 in the gear train between the drive motor 5 and the follower 21 is being absorbed by friction means (not shown) between the follower 21 and the gear 20 driving the same.

The control curve 1.4 is dimensioned in such a manner that the feeler head 23.3 of arresting lever 23 comes into contact with the circumference of the control curve during a rotation of 240°, so that the arresting tooth 23.4, during the fading-out phase and during the film return transport, prevents the follower 21 and thereby the winding spool of the cassette from rotating in the film transporting direction "forward." Consequently, the film strip driven by the film advancing gear (not shown) is being transported into the free cassette space or into the free space of the film camera during the fading-out phase in which it is not being spooled. The length of the film section to be faded-over is such that it is threaded into the free space surrounding the winding spool of the film chamber or of the film cassette without being damaged.

Upon a rotation of 120° of the control member 1, the curved area 1.12 of the control curve 1.1 has completely closed the diaphragm by means of a control slide 32. The control finger 32.3 of slide 32 has opened the switch S4 which is arranged in series with the release key S1. During the further rotation of the control member 1 which follows without interruption, the curved area 1.13 of the curve 1.1 becomes effective which, during the reversed transport of the film section provided for the fading-over, keeps the diaphragm in closed condition and the switch S4 in open position.

Simultaneous, however, in this position of the control member 1, the pole reversing switch S5 is moved into the control position II by the control curve 1.5, and more specifically, by means of the control push rod 39 of the switch S5, the rod being lifted by the rising curved portion 1.51.

Figure 2:
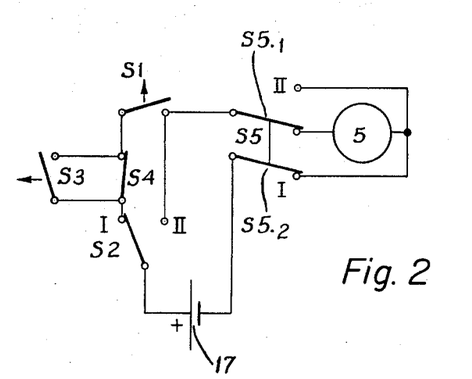
FIG. 2 shows the circuit for properly opening and closing the switches and the drive motor circuit of the camera.

According to FIG. 2, the current passes from the plus pole of the current source 17, via the switch S2 in control position II, the contact S5.1 of the pole switch S5 in control position II, the winding of the drive motor 5, the contact S5.2 of the switch S5 in control position II, to the minus pole of the current source 17.

The pole of the winding of drive motor 5 has, therefore, been changed with respect to the source 17 so that the motor shaft 5.1 rotates in opposite direction. In this way, also the transmission 4,3,2,6,7 and 8 following the shaft 5.1, rotates in opposite direction.

The gear train 18, 19, 20 following in series the worm 3, likewise rotates in reverse direction so that the drive mechanism of the camera returns the film section to be faded-over out of the range of the winding spool into the supply spool of the cassette. The follower 21 does not participate in the movement in view of the still effective arresting means 1.4,23,22 during the return film transport.

Furthermore, with the change in the direction of rotation of the gear train 2,6,7,8 of the fade-over device, also the direction of rotation of the momentum acting on plate 10 of the reversing gear 10,12,13 is reversed. Consequently, the plate 10 and the shaft 9 rotates in counter-clockwise direction (arrow 9B) so that the engagement of coupling 13 with the drive 1.11 of the control member 1 is made ineffective. Instead, the coupling gear 14 which is in constant meshing engagement with the coupling gear 13, comes into engagement with a drive gear 1.11 of the control member 1 so that the direction of rotation of the control member 1 which it had before the poles of the electromotor 5 were reversed, is being maintained.

In view of the reversal of the direction of rotation of the pair of gears, 2,6 (arrow 2B) the knee-lever linkage 16 is transferred to its straight or stretched-out position in clockwise direction in view of the positive movement of its drive lever portion 16. This position is determined by the engagement of an abutment 16.5 associated with its driven lever portion 16.2 against the longitudinal edge of the drive lever portion 16.1. The movement of the knee lever 16 into this straight or stretched-out position accelerates the control movement of the reversing gear 10,13,14 since, in view of the reduction of the gears 6,7, the lever portion 16.1 readies its stretched position before the momentum transmitted by the gear 8 onto the plate 10 disengages the coupling gear 13 of the reversing gear from the drive gear 1.11 of the control member 1.

The knee lever linkage 16, in stretched position, brings about the locking of the engagement of the coupling gear 14 of the reversing gear with the drive gear 1.11 of the control member 1. In view of this locking of the coupling position of the reversing gear which prevents a reversal of the direction of rotation of the control member 1, a momentum resulting from the rotation of the coupling gear 14 located to the right of the axis of rotation 9 of the plate 10 is excluded which could otherwise bring about the release of the engagement of the two coupling gears 14 and 1.11.

Already, prior to the completion of the return transport of the film section to be faded over, the rising portion 1.61 of a further control curve 1.6 of the control member 1, rotates a double-arm lever 40 journalled at 40.1 against the force of a tension spring 41 acting thereon. A lever arm 40.2 of lever 40 during this movement, presses the arresting latch 29, which still occupies its releasing position in view of the depressed fading over key 25, from the abutment 30.1 of the leaf-spring 30 laterally towards the left. This results in the release of the leaf-spring 30 which simultaneously forms the resilient switch contact of switch S3 so that it is lifted from the contact 30.2 of switch S3 and may tilt into its rest position (downwardly) in view of its own resiliency. In this rest position, switch S3 is open and the timely opening of switch S3 has been accomplished independently of whether or not the fade-over key 25 is still depressed or already released.

The control curve 1.6 continues to rotate, until the completion of the reverse transport of the film section to be faded-over, by a small amount in clockwise direction, and more specifically by an amount such that the feeler head 40.3 of leer 40 drops behind the rising curve portion 1.61. The lever 40 consequently rotates in clockwise direction into the rest position shown in the drawing, under the influence of tension spring 41 while the latch 29 following this control movement under spring load is rotated about the joint 27.2 in clockwise direction until it comes to rest, with still depressed fade-over key 25, adjacent the abutment 30.1 at the bottom side of the release spring 30 or, with released key 25, below the abutment 30.1. The leaf-spring 30 remains in its rest position in which the switch S3 is open.

The thus opened switch S3 assures, in accordance with the following description describing the circuit, in connection with the opened switch S4, which has been opened by means of the diaphragm control curve 1.1 of the slide 32, the automatic stopping of the drive motor 5 after completion of the re-winding phase.

All these automatically effected movements of the arresting latch 29 do not have any influence on the plate 10 of the reversing gear 10,13,14 since the arresting lever 15 holding it in the idle position is held in the releasing position during the entire faded-over phase by the control curve 1.3 of the control member 1.

Immediately preceeding the completion of the film return movement, the descending curved portion 1.52 of the control curve 1.5 permits the pole reversing switch S5 to reach the control position which brings about the forward transport of the film strip. The pole reversing switch S5 thus returns its control position I (FIG. 2) in which it reverses the pole of the winding of the drive motor 5 with respect to the current source 17, and more specifically in such a manner that the motor shaft now again rotates in a direction bringing about a forward transport of the film strip.

The flow of the current is: from the plus pole of the current source 17, via of the changeover switch S2 in control position II, the contact S5.1 of the pole reversing switch S5 in control position I, the winding of the drive motor 5, contact S5.2 of the pole reversing switch S5 in control position I, to the minus pole of the current source 17.

In view of the reversal of the direction of rotation of the motor shaft 5.1, the pair of gears 2,6 again rotates in counter-clockwise direction (arrow 2A) so that the knee lever linkage 16 is transferred again to the position shown in the drawing, in which the portions 16.1 and 16.2 of the linkage are arranged at an angle with respect to each other. Due to this, and in view of the rotation of the gear 8 driving the reversing gear in the direction of the arrow 9A, the plate 10 receives again a momentum in clockwise direction so that the coupling gear 13 of the reversing gear comes into engagement with the drive gear 1.11 of the control member 1, instead of the coupling gear 14. Consequently, the control member 1 also after the second reversal of the direction of rotation of the motor shaft 5.1 rotates further in the direction imparted upon it at the beginning of the fade-over phase.

Immediately preceding the completion of the second fading-over phase, i.e., the reverse transport of the film section exposed with the faded-out film scene, the arresting lever 23 falls with its feeler head 23.3 into a circular arc recess 1.42 of the control curve 1.4 while its arresting tooth 23.4 is pulled out of engagement with the arresting gear 22 by the tension spring 23.5. In this way, locking of the follower 21 is made ineffective so that the latter places the rewinding spool of the film cassette in motion for rewinding of the now forwardly moving film strip, at the beginning of the third fade-over phase in which the film section provided for the fade-over phase and exposed with the continuously faded-out film scene, is exposed again with the next film scene continuously to be faded-in.

Immediately after the pole reversal of the winding of the drive motor 5 in the drive circuit of the camera by means of pole reversing switch S5, the control push rod 38 of the change-over switch S2 falls into a notch 1.22 of the control curve 1.2 after rotation of the control member 1 by 240°, so that the switch S2 is placed in the control position I. In this position of the switch S2 the motor circuit is opened, even if the released key S1 should not yet have been depressed, because of the switches S3 and S4 in open position. In this way, the drive on the camera side is automatically stopped after completion of the return transport of the film section to be faded-over.

As previously described, the stopping of the camera drive in the proper functional manner after completion of the first and second faded-over phases, i.e. the forward transport of the film section to be faded-over with the continuously closing diaphragm and the reverse transport of the film section onto the supply spool with closed diaphragm, is effected by means of the fading-over device, independently of whether or not the release key S1 and/or the fading-over key 25 is still depressed.

After the camera drive has stopped automatically, the user of the camera releases the release key S1 and the fade-over key 25, both keys having become ineffective at this point, until shooting of the next film scene to be faded-over with the preceeding film scene.

In view of the release of the fade-over key 25, the angle lever 27 is rotated in clockwise direction by the tension spring 28 so that the arresting latch 29 is pulled downwardly. The arresting latch, which is spring-loaded in the direction of arrow 29A, slides along the left-hand side of the abutment 30.1 and moves below the abutment 30.1 of the leaf spring 30, whereupon it comes to rest with its right-hand longitudinal edge against the pin 15.2 of the arresting lever 15 which is in release position. The leaf spring 30 remains in the rest position shown in the drawing so that also the feeler switch S3 which is formed by switch contact 30.2, remains open.

If the camera is used after a long period of time again, the flag 32.2 which completely or partially covers the conical mark 37 in the view finder field of vision indicate to the user that the last film scene has been completed by a continuous fading-out phase and that the film scene now to be exposed will begin with a fading-over phase of the last film scene.

In order to make clear the respective positions of the fade-over device externally of the camera, control member 1 has associated therewith signalling disk 1.7 rotating with the control member. Disk 1.7 is provided with two symbols 1.71 and 1.72 characterizing the two control positions of the fade-over device, these symbols being visible in a window 42.1 in the outside wall 42 of the camera housing. The symbol designated with the reference character 1.71, such as a green field, indicates the starting position of the control member 1 permitting the filming with or without a fading-over phase, whereas the symbol 1.72, for instance a red field, would indicate to the camera user that the film scene to be taken by him begins by fading-over with the preceding film scene.

Turning on the camera drive for shooting a new film scene which is to be faded-over with the preceding scene, is effected by pressing down the release key S1 and the fading-over key 25.

With this last mentioned manipulation, in the same manner as with the first depression of the fading-over key at the beginning of the fading-over process, the switch S3 arranged in series with the release key S1 is closed, by means of the angle lever 27 and the arresting latch 29, by lifting leaf spring 30 until it abuts the control contact 30.2. Only after closing this switch the motor circuit is closed by the closed release key S1 since at the beginning of the fading-in phase the switch S4 which bridges the switch S3 is held in open position by the diaphragm control curve 1.1 and the control slide 32.

Depressing the fade-over key 25 does not have any effect on the release of the plate 10 of the reversing gear 10,13,14 at the beginning of the third fade-over phase since this plate is released by means of the control disk 1.3 acting on the arresting lever 15 during the entire fading-over process for purposes of rotating into its coupling position, which effect the selective engagement of its two coupling gears 13 and 14 with the drive wheel 1.11 of the control member 1.

By closing the release key S1 and the control key S3 arranged in series therewith, the motor circuit is closed. The flow of current is from the plus pole of the current source 17, via the change-over switch S2 in the control position I, closed switch S3, closed release key S1, the contact S5.1 of the pole-reversing switch S5 in control position I, the winding of the drive motor 5, contact S5.2 of the switch S5 in control position I, to the minus pole of the current source 17.

Motor 5 starts running so that the film strip is moved forward and the control member 1 is rotated by 120 degrees until it returns to its starting position shown in FIG. 1. With the start of movement of motor shaft 5.1, the control curve 1.2 of the control member 1 lifts the push rod 38 out of the control notch 1.22 so that the change-over switch S2 is put into its control position II. In this way, the release key S1 and the feeler switch S3 are bridged so that the motor circuit remains closed until the end of the fade-over phase irrespective of whether the release key S1 or the fade-over key 25 is pressed or released. An interruption of the fading-in scene by the user of the camera is excluded by this provision.

The process of fading-in, as in the process of fading-out, is accomplished by the adjusting slide 32 which is lowered in a continuous manner into the position shown in FIG. 1 by following the area 1.14 of the curve 1.1 under the influence of spring 33. During the lowering of the slide 32, the flag 32.2 is lowered to the same extent and thereby continuously exposes the conical mark 36 from the top. The thus continuously widening mark 36 symbolizes, for the user of the camera in the view finder field of vision, the continuous or steady opening of the diaphragm in the path or beam of rays.

Immediately following the start of the fading-in phase, the control finger 32.3 associated with the slide 32 releases the switch S4 so that the latter reaches its closing position to thereby short-circuit the switch S3.

Shortly prior to completion of the fading-in phase, in the same manner as prior to completion of the return transport phase of the film section provided for the fading-over, the arresting latch 29 is laterally pushed back from the abutment 30.1 of the spring 30 by means of a further, ascending portion 1.62 of the control curve 1.6, through the intervention of the double-arm lever 40. Consequently, the leaf spring 30 is freed to return to the position in which it opens the switch S3 as long as this has not yet been accomplished by the release of the fade-over key 25, which brings about the lowering of the arresting latch 29 and thereby the return of the leaf spring 30 to its rest position in which it opens switch S3.

Due to this provision, as with the completion of the return movement of the film the functionally proper opening of switch S3 is effected, independently of whether the fade-over key 25 has been depressed or released. The opening of switch S3, however, remains ineffective in this last phase of the fade-over process since this switch is short-circuited by the switch S4 which was closed during the fading-in phase. The switch S4, together with the depressed release key S1, keeps the circuit of the drive motor 5 after completion of the entire fading-over phase closed for the further exposure of the faded-in film scene, until the user of the camera releases the key S1.

As previously described in connection with the completion of the return transport phase of the film section provided for the fading-over phase, the switch S3 remains in its open rest position due to the fact that the arresting latch 29 by following the lever 40 which finally drops behind the rising curve portion 1.62, rotates in clockwise direction about the joint 27.2 until it comes to rest, with the fading-over key 25 still depressed, next to the abutment 30.1 at the bottom side of the leaf spring 30 or, with key 25 released (as shown), below the abutment 30.1, while, however, leaving the leaf spring 30 in its rest position.

As soon as the diaphragm is completely open, the feeler head 15.3 of the arresting lever 15, which rests against the circumference of the control curve 1.3, drops into the notch 1.31 which is located opposite the feeler head 15.3 in the atarting position of the control member 1. In this manner, the arresting lever 15 is tilted again into the position shown in FIG. 1, by the tension spring 31. In this position, arresting lever 15 rotates the reversing gear 10,13,14 in counter-clockwise direction into its idle position about the shaft 9, by means of its arresting nose 15.1 abutting against abutment 10.1 of plate 10.

The return of the arresting lever 15 into its arresting position, with the fading-over key 25 still depressed, is made possible by the engagement of the arresting latch 29 with the left-hand side of the abutment 30.1 of leaf spring 30. Thus, the arresting nose 29.1 leaves the range of pin 15.2 of the arresting lever 15 so that the tilting movement thereof is no longer prevented by the arresting latch 29.

With the fade-over key 25 released, the arresting lever 15 without being prevented by the arresting latch 29 already returned to its starting position, can tilt back to its arresting position. In this instance, the arresting nose 29.1 of the arresting latch 29 becomes effective only upon return of the arresting lever 15 to its arresting position shown in the drawing, as abutment for pin 15.2 of the arresting lever 15.

The return of the arresting lever 15 to its arresting position which brings about the transfer of the reversing gear 10,13,14 to its idling position, thus becomes effective automatically by the control and arresting keys 1.3,1.6 and 40 independently of whether or not the fading-over key 25 is still depressed.

With the automatic disengagement of the fading-over device from the camera drive, upon completion of the third fade-over phase, i.e. after complete fading-in of the film scene faded-over with the preceding film scene, the control notch 1.21 of the control curve 1.2 of control member 1 has reached the range of control push rod 38. Consequently, this push rod 38 by falling into the notch 1.21 moves the changeover switch S2 into the control position I. As a consequence, the changeover switch S2 has placed the branch containing the release key S1 into the motor circuit. Due to this change, however, the motor circuit is not being opened since the switch S4 by lowering of the diaphragm adjusting slide has reached its closed rest position. The opening of the motor circuit is effected upon completion of the fading-over phase merely by release of the release key S1, i.e. after continuing the film scene begun by the fading-in phase, at the discretion of the user of the camera.

In order to assure that the short-term opening of the motor circuit is effected without noticeable interruption of the transport of the film, which opening is effected by changing the switch S2 from the control position II to position I, the changeover switch S2 is designed as a spring switch and, in addition, is under spring pre-tension on one side, namely in the direction toward the control curve 1.2 in order to assure the continuous uninterrupted abutment of the control push rod 38 at the circumference of the control curve 1.2.

In the starting position of the control member 1, the symbol 1.71 consisting for instance of a green surface, is visible in the window 42.1 on the camera so that the user of the camera is put on notice that he can complete the following film scene either normally or, upon depressing the fade-over key 25, by a continuously fading-out scene.

The same message is given to him when looking through the view finder by the conical mark 36 freed by the covering flag 32.2, which indicates to him that the diaphragm of the camera effecting the fading-over phase is presently in the open position and consequently the fading-over device disengaged from the camera drive so that it is left up to him to either expose the next film scene normally or by fading-over into the following film scene by additionally depressing the fade-over key 25.

The follower 21 for the rewinding spool of the film cassette remains disengaged from the camera drive even after disengagement of the fade-over device from the motor, in view of the abutment of the arresting lever 23 at the circumference of the circular arc recess 1.42 of the control curve 1.4, so that also during filming of the scene following the fading-in phase, the winding spool of the camera is taken along by the follower 21 for winding the forwardly transported film strip.

It is within the scope of the present invention to arrange the automatically operating fading-over device also in movie cameras the winding spool of which is not locked against return movement. Also, the fading-over device according to this invention can be combined with a movie camera which is adapted to receive film cassettes the winding spools of which are not locked against reverse rotation.

In such instances, the fading-over device is in a very simple manner adapted to the respective camera by omitting the arresting lever 23. Consequently, the control curve 1.4 becomes ineffective so that the follower 21 can rotate the film winding spool in the respective camera or respective film cassette in opposite direction for the return transport of the film section exposed with the faded-out film scene. This film section which is transported back by the gripper feeding mechanism of the camera, can unwind from the film coil on the winding spool and wind upon the supply coil in the camera or the film cassette upon passing the film passage.

It should also be kept in mind that it is within the scope of the present invention to adapt the automatically operating fading-over device to a camera which is not equipped with a winding spool locked against return movement, simply by omitting the control disk 1.4 of the arresting wheel 22 and arresting lever 23.

From the above, it is apparent that although the invention has been described hereinbefore with respect to certain specific embodiment thereof, it is evident that many modifications and changes may be made without departing from the spirit of the invention. Accordingly, by the appended claims, we intend to cover all such modifications and changes as fall within the true spirit and scope of this invention.

We claim:

1. A motion picture camera having diaphragm means, a unidirectional winding spool, a fade-over device operable for fading-out a predetermined film section and for subsequently fading-over the same film section and camera driving means, including a reversible electric motor, comprising in combination, control means, including a set of controlling cam and cam follower means, said cam means being arranged for simultaneous rotation, transmission reversing means disconnectably disposed between said camera driving means and said control means in such a manner as to rotate said cam means during operation in the same direction irrespective of the direction of rotation of said electric motor, said set of cam and cam follower means being arranged for automatically switching and controlling during one revolution of said cams the following sequence of phases of the entire fade-over process:

1. exposing said film section while continuously closing said diaphragm means,
2. rewinding said film section while said diaphragm means is closed and stopping said camera driving means, and
3. re-exposing said film section while continuously opening said diaphragm means, wherein said transmission reversing means comprises first and second reversing gears forming a coupling means between said electric motor means and said control means, and first arresting means for keeping said coupling means in idling position when said device for fading-over two film scenes is ineffective, and second arresting means associated with said first and second reversing gears for maintaining the selected gear of said reversing gears in meshing engagement with said control means in both directions of rotation.

2. A motion picture camera according to claim 1, wherein said transmission reversing means comprises a the driving input gear, a plate rotatable about the axis of rotation of said input gear, said first reversing gear in meshing engagement with said input gear, and said second reversing gear meshing with said first reversing gear, and bearing means for said first and second reversing gears mounted on said plate.

3. A motion picture camera according to claim 1, wherein said first arresting means comprises an arresting lever, said control means comprising a first control disk adapted to keep said arresting lever in arresting position, and fade-over key means associated with said fade-over device and said arresting lever and adapted to rotate said arresting lever into releasing position upon depression of said key means, said arresting lever being kept in said releasing position during the entire fade-over phase by said control means, said releasing position permitting the selective engagement of said first and second coupling gear means respectively with a gear of said reversing gear means driving said control means.

4. A motion picture camera according to claim 3, wherein said control means comprises a first control curve means, change-over switch means associated with said first control curve means, electric motor circuit means connected to said electric motor means and including a release key and a branch bridging said release key, said change-over switch means being operable upon said control means starting to rotate from its starting position to keep said motor circuit means closed via said branch, until completion of said rewinding of said film section, and also upon actuation of said release key and said fade-over key means during said re-exposing of said film section.

5. A motion picture camera according to claim 4, which comprises feeler switch means arranged in series with said release key and operable to close said electric motor circuit means at the start of said first and second fade-over phase respectively, upon depression of said release key and said fade-over key means, said control means comprising a second control curve means for opening said motor circuit means prior to completion of said second and third fade-over phase respectively, independently of the actuation of said fade-over key means.

6. A motion picture camera according to claim 5, which comprises further switch means arranged in series with said release key, said control means comprising third control curve means for controlling said diaphragm means and operable to open said further switch means immediately prior to closing of said diaphragm means, and also operable to open said electric motor circuit means upon completion of said second fade-over phase irrespective of the actuation of said release key.

7. A motion picture camera according to claim 6, wherein said control means comprises a fourth control curve means, and pole reversing switch means arranged in said motor circuit means and operably connected to said fourth control curve means so as to be actuated by the same to reverse the poles of said electric motor means with respect to the current source of said motor circuit means, upon completion of said first fade-over phase, and to reverse the poles again upon completion of the second fade-over phase, immediately prior to stopping of said motor means.

8. A motion picture camera according to claim 7, which includes means for actuating said fade-over device upon depression of said release key, said control means being coupled to said reversing gear means in the position in which said shaft rotates in said first direction, said feeler switch means being closed for maintaining said motor circuit means even after opening of said release key.

9. A motion picture camera according to claim 8, in which said control means comprises a fifth control curve means operably connected to said first arresting means for making the engagement of said reversing gear means with said control means driving gear ineffective upon completion of said fade-over phases, said motor circuit means being kept closed by said further switch means when closing upon return of said third control curve means into its starting position, until release of said release key.

10. A motion picture camera having diaphragm means, a unidirectional winding spool, a fade-over device operable for fading-out a predetermined film section and for subsequently fading-over the same film section and camera driving means, including a reversible electric motor, comprising in combination,
control means, including a set of controlling cam and cam follower means, said cam means being arranged for simultaneous rotation,
transmission reversing means disconnectably disposed between said camera driving means and said control means in such a manner as to rotate said cam means during operation in the same direction irrespective of the direction of rotation of said electric motor,
said set of cam and cam follower means being arranged for automatically switching and controlling during one revolution of said cams the following sequence of phases of the entire fade-over process:
1. exposing said film section while continuously closing said diaphragm means,
2. rewinding said film section while said diaphragm means is closed and stopping said camera driving means, and
3. re-exposing said film section while continuously opening said diaphragm means, wherein said transmission reversing means includes adjustable reversing gears coupled between said control means and said camera driving means, and means operable for disengaging said reversing gears from said control means when said fade-over device is in an inoperative condition, wherein said reversing gear means forms a coupling means between said electric motor means and said control means, and first arresting means for keeping said coupling means in idling position when said device for fading-over two film scenes is ineffective, which comprises second arresting means associated with said reversing gear means for maintaining the appropriate gear of said reversible gear means in meshing engagement with said control means in both directions of rotation, wherein said reversing gear means comprises a first gear forming the driving input gear, a plate rotatable about the axis of rotation of said first gear, first coupling gear means in meshing engagement with said first gear, and second coupling gear means meshing with said first coupling gear means, and bearing means for said first and second coupling gear means mounted on said plate, wherein said second arresting means comprises knee-lever linkage means having a driving lever portion and a driven lever portion pivotally connected to each other, and a shaft supporting said driving lever portion for rotation therewith; reduction gear means including said first gear drivingly connected between said motor drive means and said reversing gear means for rotating said reversing gear means against the action of said first arresting means during rotation of said shaft in a first direction corresponding to the forward movement of a film in said camera, and also for moving and holding said reversing gear means in a coupling position in which said first coupling gear means meshes with said control means driving gear, upon movement of said first arresting means into the reversing gear means releasing position aided by the torque exerted on said reversing gear means by said first gear and said first coupling gear means; said shaft when rotating in a direction opposite to said first direction moving said driving lever portion into alignment with said driven lever portion in which portion said knee-lever linkage locks said reversing gear means in a coupling position in which said second coupling gear means is in meshing engagement with said control means driving gear against the action of the torque exerted on said reversing gear means by said first gear and said first and second coupling gear means.

11. A motion picture camera according to claim 10, wherein said control means comprises a first control curve means, change-over switch means associated with said first control curve means, electric motor circuit means connected to said electric motor means and including a release key and a branch bridging said release key, said change-over switch means being operable upon said control means starting to rotate from its starting position to keep said motor circuit means closed via said branch, until completion of said rewinding of said film section, and also upon actuation of said release key and said fade-over key means during said re-exposing of said film section.

12. A motion picture camera according to claim 11, which comprises feeler switch means arranged in series with said release key and operable to close said electric motor circuit means at the start of said first and second fade-over phase respectively, upon depression of said release key and said fade-over key means, said control means comprising a second control curve means for opening said motor circuit means prior to completion of said second and third fade-over phase respectively, independently of the actuation of said fade-over key means.

13. A motion picture camera having diaphragm means, a unidirectional winding spool, a fade-over device operable for fading-out a predetermined film section and for subsequently fading-over the same film section and camera driving means, including a reversible electric motor, comprising in combination, control means, including a set of controlling cam and cam follower means, said cam means being arranged for simultaneous rotation, transmission reversing means disconnectably disposed between said camera driving means and said control means in such a manner as to rotate said cam means during operation in the same direction irrespective of the direction of rotation of said electric motor, said set of cam and cam follower means being arranged for automatically switching and controlling during one revolution of said cams the following sequence of phases of the entire fade-over process:

1. exposing said film section while continuously closing said diaphragm means,
2. rewinding said film section while said diaphragm means is closed and stopping said camera driving means, and
3. re-exposing said film section while continuously opening said diaphragm means, wherein said transmission reversing means includes adjustable first and second reversing gears for coupling said control means and said camera driving means, and means operable for disengaging said reversing gears from said control means when said fade-over device is in an inoperative condition, and first arresting means for keeping said reversing gears in idling position when said device for fading-over two film scenes is ineffective, wherein said first arresting means comprises an arresting lever, said control means comprising a first control disk adapted to keep said arresting lever in arresting position, and fade-over key means associated with said fade-over device and said arresting lever and adapted to rotate said arresting lever into releasing position upon depression of said key means, said arresting lever being kept in said releasing position during the entire fade-over phase by said control means, said releasing position permitting the selective engagement of said first and second reversing gear means respectively with a gear of said control means driving said control means, wherein said control means comprises a first control curve means, change-over switch means associated with said first control curve means, electric motor circuit means connected to said electric motor means and including a release key and a branch bridging said release key, said change-over switch means being operable upon said control means starting to rotate from its starting position to keep said motor circuit means closed via said branch, until completion of said rewinding of said film section, and also upon actuation of said release key and said fade-over key means during said re-exposing of said film section, which comprises feeler switch means arranged in series with said release key and operable to close said electric motor circuit means at the start of said first and second fade-over phase respectively, upon depression of said release key and said fade-over key means, said control means comprising a second control curve means for opening said motor circuit means prior to completion of said second and third fade-over phase respectively, independently of the actuation of said fade-over key means, which comprises further switch means arranged in series with said release key, said control means comprising third control curve means for controlling said diaphragm means and operable to open said further switch means immediately prior to closing of said diaphragm means, and also operable to open said electric motor circuit means upon completion of said second fade-over phase irrespective of the actuation of said release key, which includes slide means operably connected to said third control curve means, cover flag means connected to said slide means, a view finder provided in said camera adjacent said flag means, and conical indicating means visibly arranged in said view finder, said flag means being adapted to cover said indicating means in a continuous manner during said first fade-over phase, to cover said indicating means completely during said second fade-over phase, and to free said indicating means in a continuous manner during the third fade-over phase.

14. A motion picture camera according to claim 13, which includes a window, said control means comprising a sixth control curve means having two different indicating marks selectively visible in said window, one of said marks indicating the starting position of said control means with said reversing gear means in idling position, and the other mark indicating the position of said control means before said third fade-over phase.

15. A motion picture camera having diaphragm means, a unidirectional winding spool, a fade-over device operable for fading-out a predetermined film section and for subsequently fading-over the same film section and camera driving means, including a reversible electric motor, comprising in combination, control means, including a set of controlling cam and cam follower means, said cam means being arranged for simultaneous rotation, transmission reversing means disconnectably disposed between said camera driving means and said control means in such a manner as to rotate said cam means during operation in the same direction irrespective of the direction of rotation of said electric motor, said set of cam and cam follower means being arranged for automatically switching and controlling during one revolution of said cams the following sequence of phases of the entire fade-over process:

1. exposing said film section while continuously closing said diaphragm means,
2. rewinding said film section while said diaphragm means is closed and stopping said camera driving means, and
3. re-exposing said film section while continuously opening said diaphragm means, wherein said transmission reversing means includes adjustable first and second reversing gears for coupling said control means and said camera driving means, and means operable for disengaging said reversing gears from said control means when said fade-over device is in an inoperative condition, and first arresting means for keeping said reversing gears in idling position when said device for fading-over two film scenes is ineffective, wherein said first arresting means comprises an arresting lever, said control means comprising a first control disk adapted to keep said arresting lever in arresting position, and fade-over key means associated with said fade-over device and said arresting lever and adapted to rotate said arresting lever into releasing position upon depression of said key means, said arresting lever being kept in said releasing position during the entire fade-over phase by said control means, said releasing position permitting the selective engagement of said first and second reversing gear means respectively with a gear of said control means driving said control means, wherein said control means comprises a first control curve means, change-over switch means associated with said first control curve means, electric motor circuit means connected to said electric motor means and including a release key and a branch bridging said release key, said change-over switch means being operable upon said control means starting to rotate from its starting position to keep said motor circuit means closed via said branch, until completion of said rewinding of said film section, and also upon actuation of said release key and said fade-over key means during said re-exposing of said film section, which comprises feeler switch means arranged in series with said release key and operable to close said electric motor circuit means at the start of said first and second fade-over phase respectively, upon depression of said release key and said fade-over key means, said control means comprising a second control curve means for opening said motor circuit means prior to completion of said second and third fade-over phase respectively, independently of the actuation of said fade-over key means, which comprises further switch means arranged in series with said release key, said control means comprising third control curve means for controlling said diaphragm means and operable to open said further switch means immediately prior to closing of said diaphragm means, and also operable to open said electric motor circuit means upon completion of said second fade-over phase irrespective of the actuation of said release key, wherein said control means comprises a fourth control curve means, and pole reversing switch means arranged in said motor circuit means and operably connected to said fourth control curve means so as to be actuated by the same to reverse the poles of said electric motor means with respect to the current source of said motor circuit means, upon completion of said first fade-over phase, and to reverse the poles again upon completion of the second fade-over phase, immediately prior to stopping of said motor means, which includes means for actuating said fade-over device upon depression of said release key, said control means being coupled to said reversing gear means in the position in which said shaft rotates in said first direction, said feeler switch means being closed for maintaining said motor circuit means even after opening of said release key, in which said control means comprises a fifth control curve means operably connected to said first arresting means for making the engagement of said reversing gear means with said control means driving gear ineffective upon completion of said fade-over phases, said motor circuit means being kept closed by said further switch means when closing upon return of said third control curve means into its starting position, until release of said release key, which includes slide means operably connected to said third control curve means, cover flag means connected to said slide means, a view finder provided in said camera adjacent said flag means, and conical indicating means visibly arranged in said view finder, said flag means being adapted to cover said indicating means in a continuous manner during said first fade-over phase, to cover said indicating means completely during said second fade-over phase, and to free said indicating means in a continuous manner during the third fade-over phase.

16. A motion picture camera according to claim 15, wherein said cover flag means comprises a transparent filter.

17. A motion picture camera according to claim 16, which includes a window, said control means comprising a sixth control curve means having two different indicating marks selectively visible in said window, one of said marks indicating the starting position of said control means with said reversing gear means in idling position, and the other mark indicating the position of said control means before said third fade-over phase.

18. A motion picture camera according to claim 17, wherein said control means comprises seventh control curve means, arresting lever means pivotally mounted in said camera and engaging said seventh control curve means, arresting gear means, and follower means associated with said winding spool and said arresting gear means, said seventh control curve means permitting said arresting lever means to lock said arresting gear means and said follower means against rotation during said first and second fade-over phases.

19. A motion picture camera according to claim 17 wherein the film section to be faded over is contained in a film cassette and said winding spool is associated with said film cassette, wherein said control means comprises seventh control curve means, arresting lever means pivotally mounted in said camera and engaging said seventh control curve means, arresting gear means, and follower means associated with said winding spool and said arresting gear means, said seventh control curve means permitting said arresting lever means to lock said arresting gear means and said follower means against rotation during said first and second fade-over phases.

* * * * *